Feb. 7, 1956     F. A. PALL     2,733,632

COLOR PHOTOGRAPHY AND PROJECTION

Filed Dec. 24, 1951

*Francis Pall*

INVENTOR.

United States Patent Office 2,733,632
Patented Feb. 7, 1956

2,733,632

COLOR PHOTOGRAPHY AND PROJECTION

Francis A. Pall, San Diego, Calif., assignor of one-half to Isabelle M. Pall, San Diego, Calif.

Application December 24, 1951, Serial No. 263,040

2 Claims. (Cl. 88—16.4)

The present invention relates to improvements in color photography with panchromatic film and improvements in motion or still picture color projection.

The theory of producing natural color pictures by simultaneously projecting several identical images through color filters in such a manner that the images are superimposed upon a screen is not new per se.

Heretofore methods have been proposed to produce color pictures by projecting usually three simultaneously exposed isomorphous images. Other systems have been proposed, including corrective mechanical devices, arranged to measure film shrinkages and constantly adjusting the optical system into register.

The heretofore proposed methods and systems, employing several prisms or lens segments to produce simultaneously the plurality of isomorphous images, due to the separation of the axis of the light rays, are always associated with parallax. By projecting said images simultaneously through color filters and superimposing them upon a screen into one color image, due to insurmountable difficulty of producing identical lenses or prisms for the projectors, the inherent parallax produces very objectionable color fringes, therefore none of the proposals were adopted.

Further the heretofore proposed additive type color projection—that applicant is aware of—demands numerous prisms and lenses, these altogether cut down the light transmission for the camera and make the image superimposition too difficult, intricate and too expensive for the projection.

At the presently used and generally adopted frequency, the proposals, to utilize the retaining quality of the human eye, to produce natural color effect, by exposing and projecting each subsequent frames through one of the primary color filters—failed. At that speed it is beyond the capacity of the eye to overlap the individual colors and to melt them into the desired color combination. This results in flickering or sometimes it is referred to as "color-beating." The mollification of this effect, by increasing the frequency, has to be paid for by exorbitant toll in film footage.

To eliminate the above recited disadvantages, it is here proposed and is the object of the invention, to project simultaneously two or preferably three adjacent full size color separation frames through their respective color filters and without the necessity of increasing the frequency and corresponding film length and gaining greatly desired true color, luminosity and sharpness.

It is the object of my invention, to use adjacent color separation frames in simultaneous projection, for color motion pictures, by projecting only one sharp image and diffusing the simultaneously projected associated images to eliminate the perplexity of perfect register.

A further object of my invention is to project simultaneously a group of subsequently exposed images, one of said image in sharp focus, and the adjacent images diffused, substantially lineless, as mere color fill ins.

A further object is, to retain the full size of the presently generally used motion picture frames, as well as the size of the image thereon, thereby retaining the original sharpness in the projection.

A further object is to eliminate the need of the present day organic dyes, which are too sensitive to light and with age the color fades; also to advance the color reproduction accuracy.

A further object is to use the present, generally adopted motion picture cameras and projectors and installations, including the lenses for additive type color projection and to make possible the use of the panchromatic emulsion for color motion picture photography.

A further object is to give a quasi stereoscopic effect in projection.

Further object will appear as the description proceeds.

Referring to the drawings.

Figure 1:
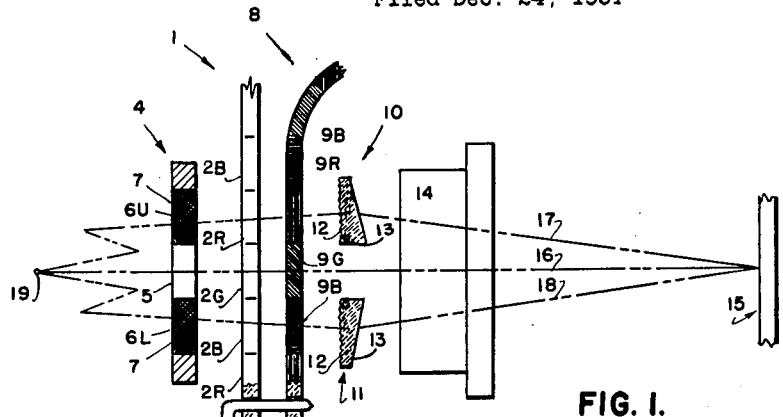
Fig. 1 is a schematical longitudinal section of a motion picture projector, adapted for three color projection.

Referring to Fig. 1 is a conventional motion picture projector, converted to the here proposed type of color motion picture projection. It will be seen that the usual motion picture film, generally at 1 (exposed in a camera in Fig. 3 to be described) is composed of usual interconnected film frames, here forming color separation groups by frames 2R, 2G and 2B and the group multiples thereof. Film 1 is here shown as stationary. In operation it is moved intermittently with a claw, generally at 3, in the usual manner, and preferably at the generally adopted frequency. At one side of the film, a light gate 4, is provided with multiple aperture and it contains a usual aperture 5, here however adjacently affixed apertures 6U and 6L, are provided and screened with any of the well known neutral density material 7 and 7 to subdue the illumination for the two adjacent frames, 2R and 2B, respectively.

Figure 4:
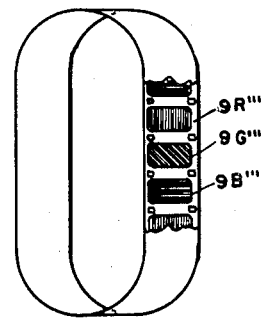
Fig. 4 is an endless belt color filter, used in projectors and cameras for color projection and color photography.

On the other side of the film, and preferably as shown and generally at 8, I illustrate the color filters, in a form of an endless belt (to be described in Fig. 4). In operation, this film belt is moved together synchronously by the claw 3, with the corresponding film frames in the usual well known manner.

Adjacent to the color filter endless belt 8, a pair of inversely positioned refracting diffuser devices, generally at 10 and 11 are affixed in spaced relation. For the simplicity of presentation, applicant illustrates the simplest form of ray refractor and diffuser, combined substantially in a form of a prismatic wedge, with a well known diffuser surface 12 on one side and an inclined plano surface 13 on the other side. It is apparent, that the function of this refracting diffuser devices 10 and 11, could also be performed by separate parts and in different forms, if so desired, without departing from the scope of this invention.

The drawing also illustrates a usual projector lens 14, a projecting screen, generally at 15, a primary ray of light 16, the upper secondary ray 17 and the lower secondary ray 18.

The longitudinal adjustment of the refracting diffuser device and the projector lens are provided by any well known adjustable device (not shown).

In operation, the intermediate ray 16, from the light source 19, is passing through aperture 5 and passes through film frame 2G, whereon an image was previously produced through a filter, corresponding in color value to filter 9G, in color filter belt 8 and the—hereafter called—primary ray 16, is sharply focused through lens 14, on screen 15 and forms a sharp—hereafter called—primary image.

Simultaneously, from the light source 19, the—hereafter called—upper secondary ray 17, through the aperture 6U (after the light intensity is somewhat reduced by screen 7), passes through the film frame 2R, whereon an image was previously produced through a filter, corresponding in color value to the filter 9R, in color filter belt 8 and passing through same. Thereafter the refracting diffuser device 10, screen surface 12, diffuses the upper secondary ray 17 and at the same time the inclined surface 13, throws the upper secondary ray 17, toward the primary ray 16 and superimposing a—hereafter called—secondary image, creating a diffused, soft color pattern of different color value on the primary image.

The lower secondary ray 18, travels from light source 19, like the upper secondary ray, here however, it passes through parts 6L, 7 and film frame 2B, color filter 9B and through part 11, toward ray 16, superimposing the primary image with another soft, diffused color pattern of another color value. As it is clear from the drawing, applicant provides the aperture 6U and 6L with a screen 7 and 7 respectively, arranged to reduce the intensity of the secondary rays 17 and 18.

The above described operation will result in a sharp primary image of the photographed object in one color value, and where the diffused color pattern of the secondary images serve only to fill in the missing colors, without sharp outlines, resulting in a full scale natural color image of the object photographed, without any fringe or ghost and particularly free from color flickering, surpassing in luminosity and true color reproduction, the presently used organic dyed color films.

It is important to note, that inasmuch as the color filters move synchronously with the film, the color of the sharp primary image and the two secondary or color fill in images will change at each frequency of the projection and the resulting colors on the screen will have a high fidelity, even including the variation of true metallic colors, if originally photographed.

Figure 2:
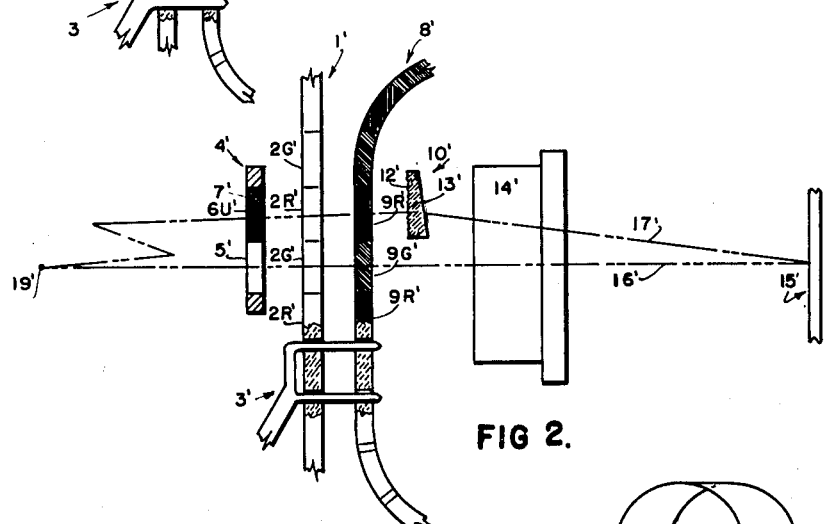
Fig. 2 is a modification of this invention for two color projection.

For certain application a two-color system is sufficient. This is illustrated in Fig. 2. Here for the simplicity of presentation the corresponding indicating numerals are duplicated, with the addition of a prime ('). As it will be seen, a motion picture film, generally at 1' is composed of the usual interconnected consecutively exposed frames, forming color separation groups of the two basic colors, by frames 2R' and 2G' and the group multiples thereof. Film 1' is here also shown, when stationary. In operation it is also moved in the usual manner by claw 3' and preferably at the adopted frequency. At one side of the film, a light gate 4' is provided, with multiple apertures. Here however, it contains an aperture 5' to permit the full illumination of the 2G' frame for the primary image and a screened aperture 6U', containing screen 7', to permit a subdued illumination for the secondary image in frame 2R' by light source 19'. On the other side of the film, generally at 8' I illustrate an endless color filter belt (to be described in Fig. 4). In operation this color filter belt is moved with the film by the same mechanism or the usual claw 3', synchronously with the corresponding color separation film frames. Adjacent to the color filter belt, a refracting diffuser device, generally at 10' is positioned, in the path of the secondary ray 17' formed of a diffuser surface 12', an angularly disposed plano surface 13'. In Fig. 2 the drawing also illustrates a projector lens 14' the primary light ray 16' and the screen 15'. In operation the primary ray 16' from light source 19' is admitted through aperture 5' and passes through frame 9G' whereon an image was previously produced through a filter, corresponding in color value to the filter 2G' in color filter belt 8' and the primary ray thereafter is sharply focused through lens 14' on screen 15' and forms a sharp primary image in one color value.

Simultaneously from the light source 19' the secondary ray 17' through the aperture 6U' and through therein disposed screen 7' and passes through the film frame 2R', whereon an image was previously produced through a filter, corresponding in color value to the filter 2R' in color filter belt 8', passing through same, thereafter the refracting diffuser device 10' will deviate and diffuse the secondary ray 17', also the light intensity will be somewhat subdued through the screen 7' and will form the secondary image, creating a soft color pattern of another value, superimposed on the primary image.

The above described operation will result in a sharp primary image of the object photographed and where the diffused secondary image will serve only to fill in the missing color values without sharp outlines, resulting in a full scale two color image of the object photographed without any fringe or ghost, and particularly free from color flickering, surpassing in luminosity and color reproduction the presently used organic dyed two tone color films.

Figure 3:
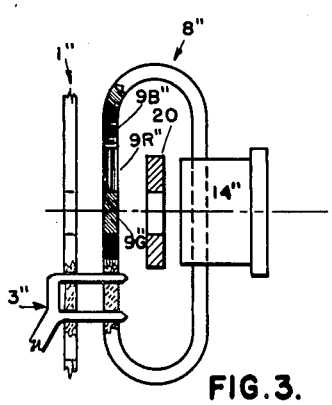
Fig. 3 is a conventional motion picture camera, converted by an endless color filter belt—shown in Fig. 4—to expose the type of color separation frames, used in these projectors.

Fig. 3 illustrates a motion picture camera, where for the simplicity of presentation, the corresponding indicating numerals are duplicated, with the addition of a double prime ("). A conventional motion picture camera, converted by adding an endless color filter belt, shown in Fig. 4, to expose the type of color separation frames in motion picture film, used in projectors in accordance with this invention. A conventional motion picture camera, here a panchromatic film, generally at 1" is fed by claw 3" and moved intermittently at the film gate 20 in the usual manner, here however adjacent to the film, a color filter endless belt, generally at 8" (to be described in Fig. 4) is arranged to be moved synchronously with the film by the same claw 3". In operation, each subsequent frame will be individually exposed through one of the color filters, resulting in groups of color separation frames.

In Fig. 4 where for the simplicity of presentation the corresponding indicating numerals are duplicated with the addition of a triple prime ('''), I illustrate a color filter assembly in a form of an endless film belt, having the same dimensions and sprocket holes as a usual motion picture film and composed of groups of the basic color filters 9G''', 9R''' and 9B''', and the group multiples thereof. The number of color filters within the groups are governed by the desired result of the color reproduction. It is quite satisfactory to use only two colors for certain purposes, but applicant here proposes the use of three colors for each group, for exceptionally true, professional results.

In Figs. 1, 2, 3 and 4, the applicant proposes the inexpensive color filter assembly in a form of an endless belt, readily adaptable to certain existing cameras and projectors, however this version is not limited to this form of color filter arrangement and when it is desired, the color filter groups could be mounted on a known rotary disc (not shown) or a reciprocating mount (not shown), without departing from the scope of this invention.

What applicant claims as his invention:

1. A system of motion picture color projection wherein three consecutively exposed color separation images of substantially equal exposure are simultaneously projected through respective color filters into one composite color image, comprising groups of three frames of color separation images, groups of three movable color filters, a light source, a light gate for passing the light from said source simultaneously through a group of three frames, the groups of color filters being so positioned and arranged that light passing through each frame passes through a color filter corresponding to a color filter through which the frame was taken, means to diffuse the picture images after their passage through two only of the three frames leaving one image in sharp focus, prisms to project the picture images passing through the outer frames and the filters onto a screen and in superposed relationship, and means to synchronize the movement of the color filters with the movement of the frames, whereby the three individually recorded images are alternately diffused and simultaneously projected through their respective color filters onto the screen, eliminating color fringes and producing fringeless natural color motion pictures.

2. A system of motion picture color projection as set forth in claim 1, including means for subduing the intensity of the diffused images.

References Cited in the file of this patent

UNITED STATES PATENTS

| | | |
|---|---|---|
| 937,367 | Friese-Greene | Oct. 19, 1909 |
| 1,413,591 | Killman | Apr. 25, 1922 |
| 1,454,218 | Folmer | May 8, 1923 |
| 1,579,024 | O'Grady | Mar. 30, 1926 |
| 1,794,103 | Cubitt | Feb. 24, 1931 |
| 2,028,485 | Wright | Jan. 21, 1936 |
| 2,073,798 | Hillman | Mar. 16, 1937 |
| 2,199,057 | Tuck et al. | Apr. 30, 1940 |

FOREIGN PATENTS

| | | |
|---|---|---|
| 166,344 | Great Britain | July 13, 1921 |